United States Patent
Johnson et al.

(10) Patent No.: US 12,404,947 B2
(45) Date of Patent: Sep. 2, 2025

(54) SOLENOID VALVE

(71) Applicant: Penny & Giles Controls Ltd, Christchurch (GB)

(72) Inventors: Hugh Johnson, Fordingbridge (GB); Andrew Mcmillen, Christchurch (GB)

( * ) Notice: Subject to any disclaimer, the term of this patent is extended or adjusted under 35 U.S.C. 154(b) by 448 days.

(21) Appl. No.: 17/602,624

(22) PCT Filed: Apr. 9, 2020

(86) PCT No.: PCT/EP2020/060274
§ 371 (c)(1),
(2) Date: Oct. 8, 2021

(87) PCT Pub. No.: WO2020/208199
PCT Pub. Date: Oct. 15, 2020

(65) Prior Publication Data
US 2022/0196177 A1    Jun. 23, 2022

(30) Foreign Application Priority Data

Apr. 11, 2019 (GB) ..................... 1905129

(51) Int. Cl.
*F16K 31/06* (2006.01)
*F16K 17/04* (2006.01)
(Continued)

(52) U.S. Cl.
CPC ...... *F16K 31/0631* (2013.01); *F16K 17/0406* (2013.01); *F16K 17/0473* (2013.01);
(Continued)

(58) Field of Classification Search
CPC ............... F16K 31/0631; F16K 31/082; F16K 17/0406; F16K 17/0473; F16K 31/01;
(Continued)

(56) References Cited

U.S. PATENT DOCUMENTS 2,515,029 A * 7/1950 Almond .............. F16K 31/0679
137/625.65
2,826,215 A * 3/1958 Wolfslau .............. F16K 31/0693
251/282
(Continued)

FOREIGN PATENT DOCUMENTS

DE       19834786 A1    2/2000
DE   102008034759 A1    2/2010
(Continued)

OTHER PUBLICATIONS

Search Report from the Intellectual Property Office of the United Kingdom for Application No. GB1905129.1 dated Oct. 11, 2019.
(Continued)

*Primary Examiner* — Craig J Price
(74) *Attorney, Agent, or Firm* — Goodwin Procter LLP

(57) ABSTRACT

A solenoid valve for controlling a fluid flow comprises an actuating member moveable between a first position and a second position. Movement of the actuating member in one direction effects opening of the valve and movement of the actuating member in an opposite direction effects closing of the valve. The solenoid valve comprises a biasing member for biasing the actuating member towards the first position; and an armature moveable in response to energising/de-energising of the solenoid valve. Energising the solenoid valve is operable to move the armature to engage the actuating member and cause movement of the actuating member to the second position against the biasing member. De-energising the solenoid valve allows the biasing member to effect movement of the armature and the actuating member towards the first position, initially causing disengagement of the armature from the actuating member, and, subsequently causing retainment of the armature in a resting position.

13 Claims, 3 Drawing Sheets

(51) Int. Cl.
*F16K 31/08* (2006.01)
*H01F 7/08* (2006.01)
*H01F 7/16* (2006.01)
*F16K 11/056* (2006.01)

(52) U.S. Cl.
CPC ........... *F16K 31/082* (2013.01); *H01F 7/081* (2013.01); *H01F 7/16* (2013.01); *F16K 11/056* (2013.01); *F16K 31/0675* (2013.01); *H01F 2007/086* (2013.01)

(58) Field of Classification Search
CPC .... F16K 31/0693; F16K 31/0675; F16K 1/14; F16K 11/056; F16K 11/044; H01F 7/081; H01F 7/16; H01F 2007/086; H01F 7/1615; Y10T 137/87209; Y10T 137/87217; Y10T 137/86622
USPC .............. 137/625–625.39, 901, 523, 596.17; 251/129.01–129.22
See application file for complete search history.

(56) References Cited

U.S. PATENT DOCUMENTS

| | | | | |
|---|---|---|---|---|
| 3,212,751 A * | 10/1965 | Hassa | ................... | F16K 31/086 251/65 |
| 3,521,661 A * | 7/1970 | Staiger | ................. | F04D 27/023 137/220 |
| 3,707,992 A * | 1/1973 | Ellison | ................ | F16K 31/0696 251/282 |
| 3,952,774 A * | 4/1976 | Loveless | ............. | F16K 31/0634 137/625.5 |
| 3,989,063 A | 11/1976 | Brouwers et al. | | |
| 4,050,477 A * | 9/1977 | Acar | ..................... | F16K 11/056 137/625.65 |
| 4,165,762 A * | 8/1979 | Acar | ................... | F16K 31/0631 137/625.5 |
| 4,610,265 A * | 9/1986 | Nelson | .................... | F16K 1/126 251/30.01 |
| 4,611,631 A * | 9/1986 | Kosugi | ............... | F16K 31/0627 137/625.65 |
| 4,919,497 A | 4/1990 | Kaes | | |
| 5,029,807 A * | 7/1991 | Fuchs | ................... | F16K 31/082 251/65 |
| 5,076,323 A * | 12/1991 | Schudt | ................ | F16K 31/0637 251/129.21 |
| 5,167,442 A * | 12/1992 | Alaze | .................... | F16K 17/048 303/119.2 |
| 5,476,313 A * | 12/1995 | Lauer | .................... | B60T 8/4809 303/119.2 |
| 6,238,014 B1 * | 5/2001 | Tamai | ................... | B60T 8/4872 303/119.2 |
| 6,250,725 B1 * | 6/2001 | Schnalzger | ........... | F15B 13/044 303/119.2 |
| 6,666,231 B2 * | 12/2003 | Entwistle | ............ | F16K 31/0689 251/52 |
| 6,708,725 B2 * | 3/2004 | Entwistle | ............ | F16K 31/0631 251/52 |
| 7,789,066 B2 * | 9/2010 | Torii | ................ | F02M 35/10255 123/336 |
| 8,151,824 B2 * | 4/2012 | Williams | ............ | F16K 31/0627 137/625.69 |
| 10,190,476 B2 * | 1/2019 | Fangauer | ............. | F16K 17/048 |
| 2003/0057394 A1 | 3/2003 | Makino | | |
| 2007/0095955 A1 | 5/2007 | Hoffmann et al. | | |
| 2013/0228711 A1 * | 9/2013 | Harrell | ................... | F16K 31/42 251/129.15 |
| 2018/0355993 A1 * | 12/2018 | Peterson | ............ | F16K 31/0631 |
| 2019/0049028 A1 | 2/2019 | Beuschel et al. | | |
| 2020/0055509 A1 * | 2/2020 | Stahr | ...................... | H01F 7/127 |

FOREIGN PATENT DOCUMENTS

DE 102008038338 A1 2/2010
GB 2045899 A 11/1980

OTHER PUBLICATIONS

International Preliminary Report on Patentability of International Application No. PCT/EP2020/060274 dated Oct. 21, 2021.

* cited by examiner

SOLENOID VALVE

CROSS-REFERENCE TO RELATED APPLICATIONS

This application is a U.S. national stage application, filed under 35 U.S.C. § 371, of International Application No. PCT/EP2020/060274, filed on Apr. 9, 2020, which claims priority to United Kingdom Application No. 1905129.1 filed Apr. 11, 2019; the entire disclosures of which are incorporated herein by reference in their entireties for all purposes.

FIELD OF INVENTION

The invention relates to solenoid valves, in particular, solenoid valves used for controlling a secondary air flow in a jet engine.

INTRODUCTION

Solenoid valves are used to control a flow of fluid. Typically, when solenoid valves are energised or de-energised, flow is allowed or prevented. Solenoid valves usually include an actuator that is moved by creating an electromagnetic field. Movement of the actuator controls opening and closing of the valve.

Solenoid valves are used in extreme environments such as to rapidly control a secondary air flow to a secondary air system of a jet engine. Here, solenoid valves are subject to vibration, extreme acceleration, and extreme temperature environments. For example, such solenoid valves may be subject to temperatures of around 600 degrees centigrade. These extreme conditions can cause solenoid valves to not function properly. For example, material properties can degrade at high temperatures meaning that forces caused by contact between moving parts can cause increased wear and damage than would otherwise be the case in a less extreme environment.

In addition, extreme changes in temperature undesirably affects stroke clearances of sub components due to differential thermal expansion.

It is an object of the present invention to address these problems and to provide an improved solenoid valve.

SUMMARY

According to a first aspect of the invention there is provided a solenoid valve for controlling a fluid flow. The solenoid valve comprises: an actuating member moveable between a first position and a second position, wherein movement of the actuating member in one direction effects opening of the valve and movement of the actuating member in an opposite direction effects closing of the valve; a biasing means such as a spring for biasing the actuating member towards the first position; and an armature moveable in response to energising/de-energising of the solenoid valve. Energising the solenoid valve is operable to move the armature to engage the actuating member and cause movement of the actuating member to the second position against action of the biasing means. De-energising the solenoid valve allows the biasing means to effect movement of the armature and of the actuating member towards the first position, initially causing disengagement of the armature from the actuating member, and, subsequently causing retainment of the armature in a resting position. Preferably, this retainment is magnetic retainment but other methods of retainment may be used such as a disengageable hook connection.

The biasing means may be a biasing member or an elastic object/substance that stores mechanical energy.

Advantageously, the actuating member is disengaged (or de-coupled) from the armature during movement of the actuating member towards the first position when the valve is de-energised. This means that the armature and actuating member are not in contact when the armature is stopped at the resting position. Any kinetic energy removed from the armature when the armature is stopped is advantageously not transferred to the actuating member.

Opening or closing (but preferably closing) of the valve is effected by the force of the biasing means after the actuating member is disengaged from the armature. The actuating member and any valve opening/closing mechanisms that are connected to the actuating member are therefore subject to less, or even, no impact stress caused by the stopping of the armature at the resting position.

The present invention reduces the amount of energy transferred to the actuating member when the valve is to be opened or (preferably) closed as a result of the solenoid valve being de-energised. However, when the solenoid valve is energised, there is still sufficient energy transferred to the armature to overcome any forces maintaining the armature in the resting position, and, to cause movement of the actuating member against the biasing means after the actuating member is engaged by the armature.

The reduction in energy transferred to the actuating member and resulting reduction of impact force to the actuating member means that degradation of components or materials in the solenoid valve is reduced. This effect is particularly important in mitigating degradation to the actuating member and any corresponding valve mechanism caused by impact forces and exacerbated by the extreme environment such as high temperature.

Optionally, the solenoid valve further comprises a permanent magnet providing a magnetic force sufficient to magnetically retain the armature in the resting position.

Preferably, energising the solenoid valve is operable to provide sufficient electromagnetic force to the armature to overcome the magnetic force in order for the armature to move away from the resting position.

Advantageously, magnetic retainment of the armature in the resting position, such as by using the optional permanent magnet, reduces or even prevents any subsequent substantial movement of the armature when in the resting position and the solenoid valve is de-energised. Without any such retainment, the armature would be free to move under acceleration loads when the valve is de-energised because the armature is decoupled from the actuation member. This could cause allow significant vibration and/or oscillation of the armature of a valve mounted in, for example, a jet engine. Such vibration could cause excessive wear and failure and is prevented using magnetic retainment such as the permanent magnet. The armature itself may be at least partially magnetic (or ferromagnetic) and therefore attracted to the permanent magnet.

Preferably, the magnetic force provided by the permanent magnet is sufficient to retain the armature in the resting position when the solenoid valve is under acceleration loads (such as those experienced by components in a jet engine of an aircraft). The armature may be retained to such a degree that it is not subject to vibration under acceleration loads.

The actuating member may be configured to cause closure of the valve when the actuating member is in the first position and to cause opening of the valve when the actuating member moves towards the second position.

Optionally, the actuating member and the armature are both configured to move along a common axis.

Optionally, the contact surface of the armature is spaced from the actuating member by a de-energised gap when the armature is in the resting position and the actuating member is in the first position.

Optionally, the de-energised gap is between 0.002 inches and 0.010 inches (0.051 mm to 0.254 mm). Preferably, the de-energised gap is between 0.004 inches and 0.005 inches (0.100 and 0.130 mm).

Optionally, the actuating member comprises a stem extending into an internal space within the armature. Optionally, the contact surface of the armature is within the internal space of the armature and is configured to abut with a head portion of the stem when the armature engages the actuating member.

This arrangement enables the armature to engage with the actuating member whilst being surrounded by solenoid coils for providing the electromagnetic field that causes movement of the armature whilst providing for a compact design of the solenoid valve.

Optionally, the solenoid valve further comprises a cavity surrounded by solenoid coils, and, wherein the armature is configured to axially move within the cavity due to the electromagnetic force generated when a voltage is applied to the solenoid coils.

Optionally, the biasing means is a spring attached between a fixture point and the actuating member. The spring may extend through the internal space of the armature between the head portion and a fixture point in the cavity.

Optionally, the solenoid valve further comprises a stopping member comprising a frusto-conical surface configured to axially stop an inner portion of the armature when the armature reaches the resting position. Optionally, the inner portion of the armature is shaped to substantially conform to the frusto-conical surface.

Whilst the permanent magnet discussed above reduces axial motion, the cone formed by the frusto-conical surface helps to reduce or even prevent radial motion and rocking of the armature, thereby further reducing wear on the armature.

Optionally, the actuating member is configured to maintain a valve ball on a valve seat when the actuating member is in the first position thereby preventing a fluid flow out of an air inlet chamber, and, when the actuating member is in the second position, the actuating member is configured to allow the valve ball to be released from the valve seat by pressure of a fluid thereby allowing a the fluid to flow out of an air inlet chamber.

The features discussed above are particularly advantageous for use with a valve ball and seat. A valve ball and seat arrangement is particularly susceptible to wear caused by impact stress on the valve ball or valve seat that could be caused by dissipation of kinetic energy from the armature if the armature was not decoupled from the actuation member. The decoupling of the armature and actuation member reduces impact stresses on the valve ball and valve seat thereby rendering the solenoid valve more suitable for use in high temperature environments such as in a jet engine.

Optionally, the solenoid valve is configured to allow or prevent a secondary air flow to a secondary air system in a jet engine.

There is also disclosed a pneumatic solenoid valve as described above wherein the actuating member is movable to open the valve in response to a fluid pressure acting against the actuating member and biasing means.

According to a second aspect of the invention there is provided a method of controlling a fluid flow comprising the steps of:

moving an actuating member between a first position and a second position, wherein movement of the actuating member in one direction effects opening of the valve and movement of the actuating member in an opposite direction effects closing of the valve;

providing a biasing means for biasing the actuating member towards the first position;

moving an armature in response to energising/de-energising of the solenoid valve;

energising the solenoid valve to move the armature to engage the actuating member and cause movement of the actuating member to the second position against action of the biasing means; and de-energising the solenoid valve to allow the biasing means to effect movement of the armature and of the actuating member towards the first position, initially causing disengagement of the armature from the actuating member, and, subsequently causing retainment of the actuating member in a resting position.

DETAILED DESCRIPTION

Figure 1:
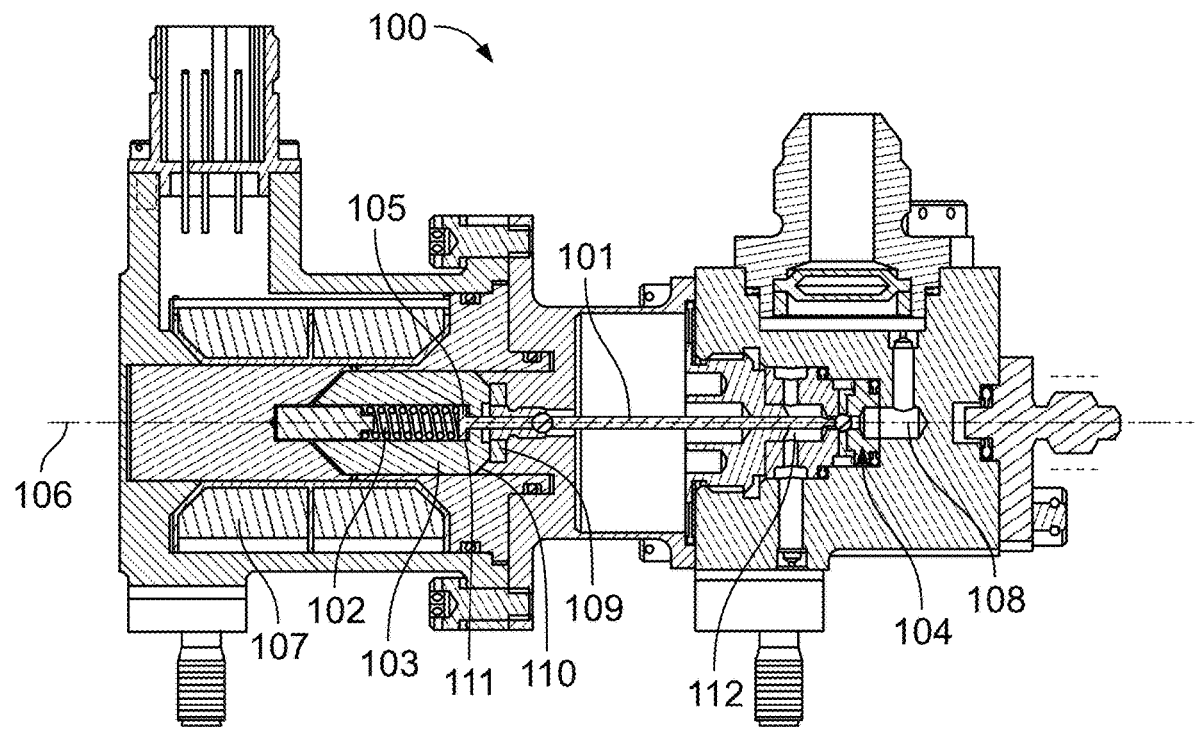
FIG. 1 is a cross-sectional representation of a solenoid valve when in a de-energised state according to this disclosure.
Figure 2:
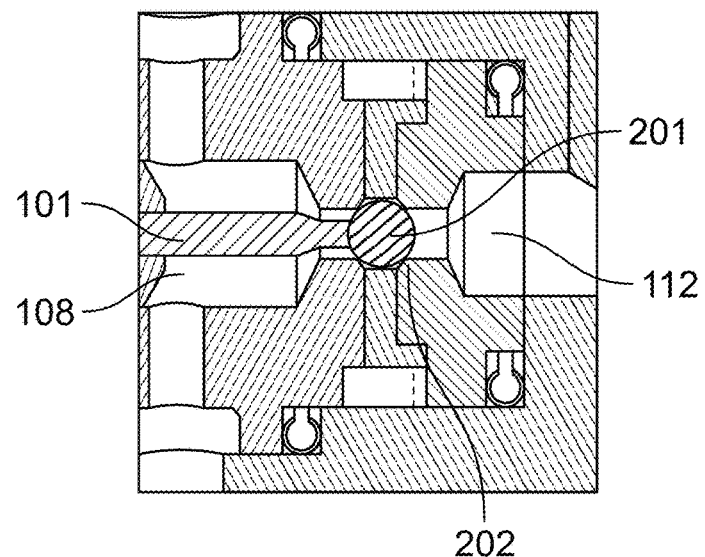
FIG. 2 is a cross-sectional magnified view of a valve mechanism of the solenoid valve of FIG. 1.
Figure 3:
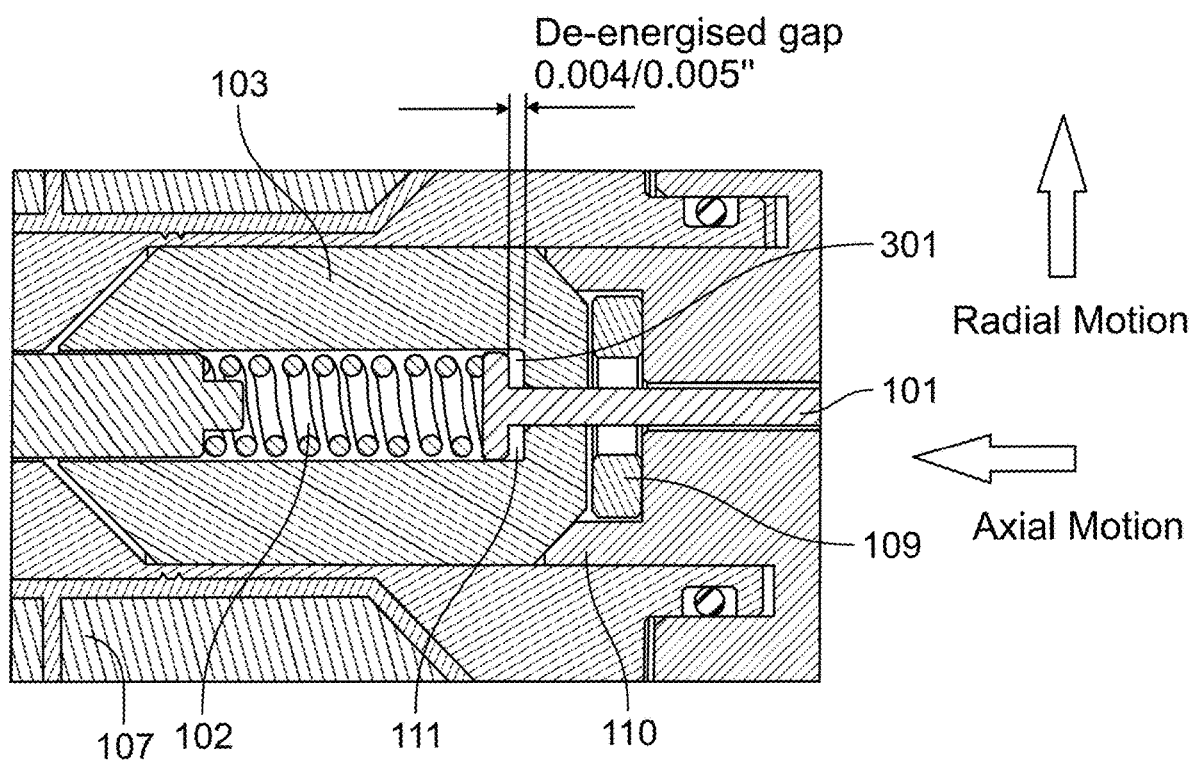
FIG. 3 is a cross-sectional magnified view of an armature of the solenoid valve of FIG. 1.

With reference to FIGS. 1 to 3 there is disclosed a solenoid valve 100. Components of the solenoid valve 100 are movable along axis 106 in either direction. This is referred to as axial movement.

An actuating member 101 is connected between a spring 102 and a valve mechanism 104. In this example, the valve mechanism 104 is a valve ball 201 and valve ball seat 202 (as shown in FIG. 2) but other arrangements could be utilised. A head portion 105 of the actuating member 101 is located within an internal cavity of an armature 103, the armature 103 usually comprising a ferromagnetic material. The head portion 105 is flanged so that it abuts with an internal surface 111 within the internal cavity of armature 103 when the head portion 105 and armature 103 are at certain axial positions relative to one another. The actuating member 101 is biased towards a first position (which is the position as shown in the Figures) and is axially movable to a second position (not shown) against the action of the spring 102 which, in the shown example, effects opening of the valve.

The armature 103 is movable axially within the cavity of the solenoid valve under electromagnetic force provided by coils 107. For example, when an electric current flows through coils 107 (i.e. when the solenoid is energised), the armature 103 is pulled against the biasing force of the spring 102. The armature 103 is shown in a resting position in the Figures and is movable in response to energising/de-energising of the solenoid. It can be seen from the Figures that movement of the armature 103 in an axial direction (to the left in the example of FIG. 1) would cause contact of the internal surface 111 of the armature 103 with the head portion 105 of the actuation member 101.

A permanent magnet 109 is located axially adjacent to the armature 103 when the armature 103 is in the resting position. In the shown example, the armature 103 radially surrounds the actuating member 101. The permanent magnet 109 is configured to magnetically retain the armature 103 in a fixed position. However the armature 103 can still move in response to energising of the solenoid since the energising provides sufficient electromagnetic force for the armature 103 to overcome the magnetic attraction provided by the permanent magnet 109.

A stopping member having a frusto-conical surface 110 is also located axially adjacent to the armature 103. In the shown example, the frusto-conical surface 110 radially surrounds the permanent magnet when the armature 103 is in the resting position. The frusto-conical surface 110 conforms to a corresponding surface of the armature 103 such that radial movement of the armature 103, for example due to vibration, is minimised.

In operation, the solenoid valve controls a fluid flow, for example enabling air to flow i) in a first direction from a common source to a vent 112 or ii) in a second direction from a common source to an air inlet chamber 108 as will be described further below. The direction of air flow depends on whether the solenoid valve is in an energised state or a de-energised state. These states will be described below in more detail:

The solenoid valve as shown in FIGS. 1 to 3 is in a de-energised state. In this condition the actuating member 101 is in a first position, in which in this example the valve is closed. In particular, with reference to FIG. 3, there is a de-energised gap 301 in between the head of the actuating member 101 and the internal surface 111 of the actuator. The armature is therefore de-coupled from the actuating member 101 that operates the valve mechanism 104. The axial distance of the de-energised gap may be between 0.004 and 0.005 inches (0.100 and 0.130 mm). The axial distance is sufficient to minimise any further contact between the armature 103 and actuating member 101 after the decoupling (for example caused by vibration). In the de-energised state, the armature 103 is held in position by the magnetic force of the permanent magnet 109 and the abutment of the armature 103 with the cone 110. These features restrict movement of the armature. Therefore, the armature 103 is prevented from being subject to undesirable vibration or motion caused by acceleration loads on the solenoid valve that, for example, components in a jet engine would typically be subjected to. Such undesirable vibration or motion causes excessive wear that would be exacerbated by the extremely high temperatures that such components are subjected to, for example, around 600 degrees centigrade.

When the solenoid valve is energised to enter the energised state, the armature 103 is configured to axially move due to the electromagnetic force generated by the solenoid coils 107. The armature 103 moves towards the head 105 of the actuating member 101 thereby closing the de-energised gap. The solenoid coils 107 provide sufficient electromagnetic force to overcome the magnetic force of the permanent magnet 109 that is holding the armature in the resting position. Once the armature 103 contacts the head 105 of the actuating member 101, the actuating member 101 is drawn away from the first position against the force of the spring 105, thereby compressing the spring 105 and building potential energy. The actuating member 101 is now in the second position. At this point, the valve mechanism 104 is allowed to open due to the pressure of air in the air inlet chamber 108. In some embodiments, the solenoid valve may be configured to enable the valve to be opened merely due to an extremely high pressure in the inlet chamber 108 that is sufficient to force the actuation member against the spring 105, for example for preventing pressure in the air inlet chamber 108 from exceeding an acceptable level whether or not the solenoid valve is energised.

When the solenoid valve is de-energised, the potential energy that has built up in the (now compressed) spring 105 is released thereby forcing both the armature and the actuating member 101 back towards the first position. The actuating member 101 causes closure of the valve mechanism 104. The closure of the valve mechanism 104 is accomplished due to the biasing force provided by the spring 105. Meanwhile, the armature 103 continues moving due to one or both of momentum acquired from the spring 105 and the magnetic attraction of the permanent magnet 109. Eventually, the armature 103 will be stopped by coming into contact with the frusto-conical surface 110 of the stopping member. The kinetic energy of the armature 103 is advantageously dissipated on the abutment member because the armature 103 has become decoupled from the actuating member 101. Therefore, kinetic energy of the armature 103 is not dissipated on the valve mechanism 104 which would lead to excessive wear of the valve mechanism 104 and even damage.

Figure 4:
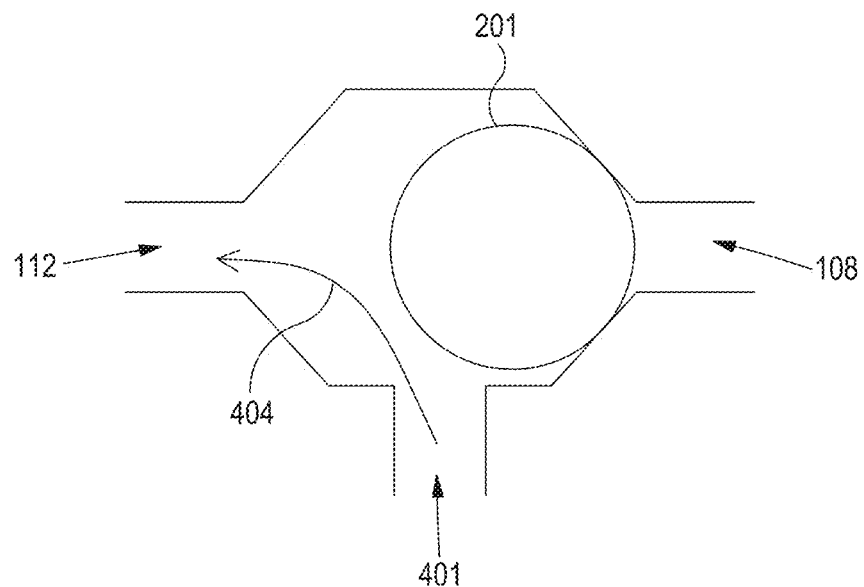
FIG. 4 is a schematic view of an example valve mechanism of the solenoid valve of FIG. 1 when in the de-energised state (valve closed).
Figure 5:
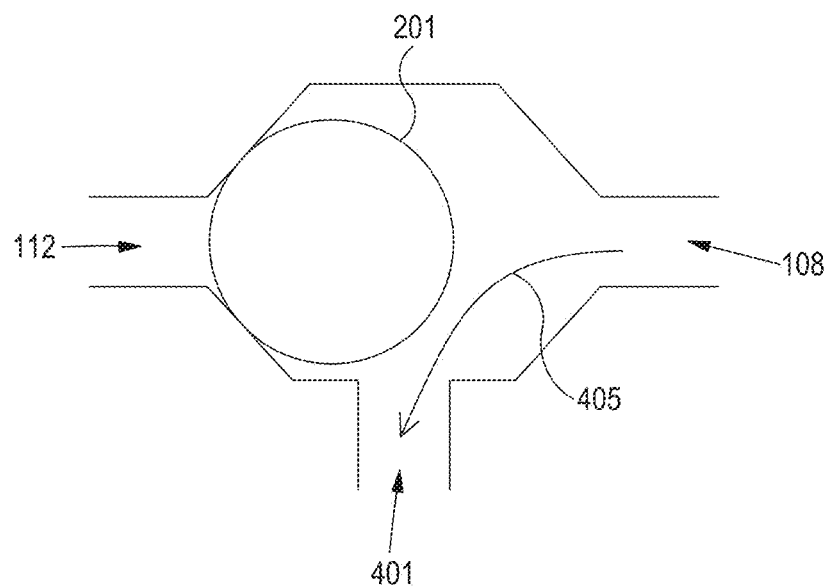
FIG. 5 is a schematic view of an example valve mechanism of the solenoid valve of FIG. 1 when in the energised state (valve open).

A possible arrangement for the valve mechanism 104 is now described in more detail with reference to FIGS. 4 and 5. The valve mechanism includes a common source 401 for providing high pressure fluid flow. Depending on the position of the ball 201, the fluid can be directed to flow from either i) the common source 401 to a vent 112 as shown in FIG. 4 and indicated by arrow 404, or ii) the inlet chamber 108 to the common source 401 as shown in FIG. 5 and indicated by arrow 405. When the actuating member 101 is in the first position, the ball 201 is held in the position shown in FIG. 4 by the force of the biasing means 102 enabling fluid to flow in the direction 404 thus preventing fluid flow out of the inlet chamber 108. When the actuating member 101 is in the second position, the ball 201 is pushed to the position shown in FIG. 5 by pressure provided by the inlet 108 and/or the common source 401 thus enabling fluid to flow out of the inlet 108 to the common source 401.

The invention improves valve component life and impact stress on the ball, valve seat, and other components transferring load from the spring 102 is reduced. The solenoid valve is therefore more suitable for use in high temperature environments, since material properties degrade at elevated temperature and are more susceptible to wear/damage caused by undesirable impact stress.

In the example discussed above, the first position of the armature 103 corresponds to closing the valve 104 and the second position of the armature 103 corresponds to opening the valve 104. However in other examples the first position of the armature 103 corresponds to opening the valve 104 and the second position of the armature 103 corresponds to closing the valve 104. For example, the valve mechanism may be a ball and seat arrangement located on the left side of the armature 103 whilst the spring 102 and head 105 of the actuating member have the same arrangement shown in the Figures. In this case, energising the solenoid valve would cause compression of the spring and closure of the valve.

De-energising the solenoid valve would cause opening of the valve due to the biasing force of the spring.

The invention claimed is:

1. A solenoid valve for controlling a fluid flow, the solenoid valve comprising:
   an actuating member moveable between a first position and a second position, wherein movement of the actuating member in one direction effects opening of the solenoid valve and movement of the actuating member in an opposite direction effects closing of the solenoid valve;
   a biasing means having an equilibrium position configured to bias the actuating member towards the first position; and
   an armature moveable in response to energising/de-energising of the solenoid valve,
   wherein;
   energising the solenoid valve is operable to move the armature to engage the actuating member and cause movement of the actuating member to the second position against action of the biasing means; and
   de-energising the solenoid valve causes the biasing means to return to the equilibrium position thereof and to effect movement of the armature and of the actuating member towards the first position, initially causing disengagement of the armature from the actuating member, and, subsequently causing retainment of the armature in a resting position, and wherein the solenoid valve further comprises a permanent magnet located axially adjacent to the armature when the armature is in the resting position and providing a magnetic force sufficient to magnetically retain the armature in the resting position, and, wherein energising the solenoid valve is operable to provide sufficient electromagnetic force to the armature to overcome the magnetic force in order for the armature to move away from the permanent magnet.

2. The solenoid valve of claim 1 wherein the magnetic force provided by the permanent magnet is sufficient to retain the armature in the resting position when the solenoid valve is under acceleration loads.

3. The solenoid valve of claim 1 wherein the actuating member is configured to cause closure of the solenoid valve when the actuating member is in the first position, and, wherein the actuating member is configured to cause opening of the solenoid valve when the actuating member moves towards the second position.

4. The solenoid valve of claim 1 wherein the actuating member and the armature are both configured to move along a common axis.

5. The solenoid valve of claim 1 wherein a contact surface of the armature is spaced from the actuating member by a de-energised gap when the armature is in the resting position and the actuating member is in the first position.

6. The solenoid valve of claim 5 wherein the de-energised gap is between 0.002 inches and 0.010 inches (0.051 mm to 0.254 mm).

7. The solenoid valve of claim 6, wherein the de-energised gap is between 0.004 inches and 0.005 inches (0.100 and 0.130 mm).

8. The solenoid valve of claim 1 wherein the actuating member comprises a stem extending into an internal space within the armature, and, wherein a contact surface of the armature is within the internal space of the armature and is configured to abut with a head portion of the stem when the armature engages the actuating member.

9. The solenoid valve according to claim 1 further comprising a cavity surrounded by solenoid coils, and, wherein the armature is configured to move within the cavity due to the electromagnetic force generated when a voltage is applied to the solenoid coils.

10. The solenoid valve according to claim 1 wherein the biasing means is a spring.

11. The solenoid valve according to claim 1 further comprising a stopping member having a frusto-conical surface configured to axially stop an inner portion of the armature when the armature reaches the resting position, and wherein the inner portion of the armature is shaped to substantially conform to the frusto-conical surface.

12. The solenoid valve according to claim 1 wherein, the actuating member is configured to maintain a valve ball on a valve seat when the actuating member is in the first position thereby preventing a fluid flow out of an air inlet chamber, and, when the actuating member is in the second position, the actuating member is configured to allow the valve ball to be released from the valve seat by pressure of a fluid thereby allowing the fluid to flow out of an air inlet chamber.

13. A method of controlling a fluid flow comprising the steps of:
   moving an actuating member between a first position and a second position, wherein movement of the actuating member in one direction effects opening of a solenoid valve and movement of the actuating member in an opposite direction effects closing of the solenoid valve;
   providing a biasing means having an equilibrium position configured to bias the actuating member towards the first position;
   moving an armature in response to energising/de-energising of the solenoid valve;
   energising the solenoid valve to provide sufficient electromagnetic force to the armature to overcome a magnetic force between the armature and a permanent magnet in order for the armature to move away from the permanent magnet and to engage the actuating member and cause movement of the actuating member to the second position against action of the biasing means; and
   de-energising the solenoid valve to cause the biasing means to return to the equilibrium position thereof and to effect movement of the armature and of the actuating member towards the first position, initially causing disengagement of the armature from the actuating member, and, subsequently causing retainment of the actuating member axially adjacent to the permanent magnet in a resting position, the permanent magnet providing the magnetic force sufficient to magnetically retain the armature in the resting position.

* * * * *